4 Sheets--Sheet 1.

H. REYNOLDS & R. T. BARTON.
Machines for Making Metallic Nuts.

No. 148,626. Patented March 17, 1874.

Witnesses:
T. C. Brecht.
H. P. Harwood.

Inventor:
Henry Reynolds
R. T. Barton

H. REYNOLDS & R. T. BARTON.
Machines for Making Metallic Nuts.

No. 148,626. Patented March 17, 1874.

Witnesses:
T. C. Brecht.
M. P. Harwood.

Inventor:
Henry Reynolds
R. T. Barton

UNITED STATES PATENT OFFICE.

HENRY REYNOLDS AND RICHARD T. BARTON, OF NEW HAVEN, CONNECTICUT, ASSIGNORS OF ONE-THIRD THEIR RIGHT TO HIRAM STEVENS, OF SAME PLACE.

IMPROVEMENT IN MACHINES FOR MAKING METALLIC NUTS.

Specification forming part of Letters Patent No. 148,626, dated March 17, 1874; application filed January 7, 1874.

*To all whom it may concern:*

Be it known that we, HENRY REYNOLDS and RICHARD T. BARTON, of the city of New Haven, in the county of New Haven and State of Connecticut, have invented certain new and useful Improvements in Machines for Making Nuts; and we do hereby declare the following to be a full, clear, and exact description of the invention, such as will enable others skilled in the art to which it pertains to make and use it, reference being had to the accompanying drawings, which form part of this specification, and in which similar letters of reference indicate corresponding parts in the different figures.

This invention relates to that class of nut-machines which form a series of nuts simultaneously, at each revolution of its driving-shaft, from a bar of iron of suitable size, which is fed into the machine transversely at each reciprocation of its operative parts; and it consists in the construction and arrangement of the dies in which the nuts are swaged and punched, and in the method of arranging and adjusting the punches and other operative mechanism, as will be hereinafter fully set forth.

Figure 1:
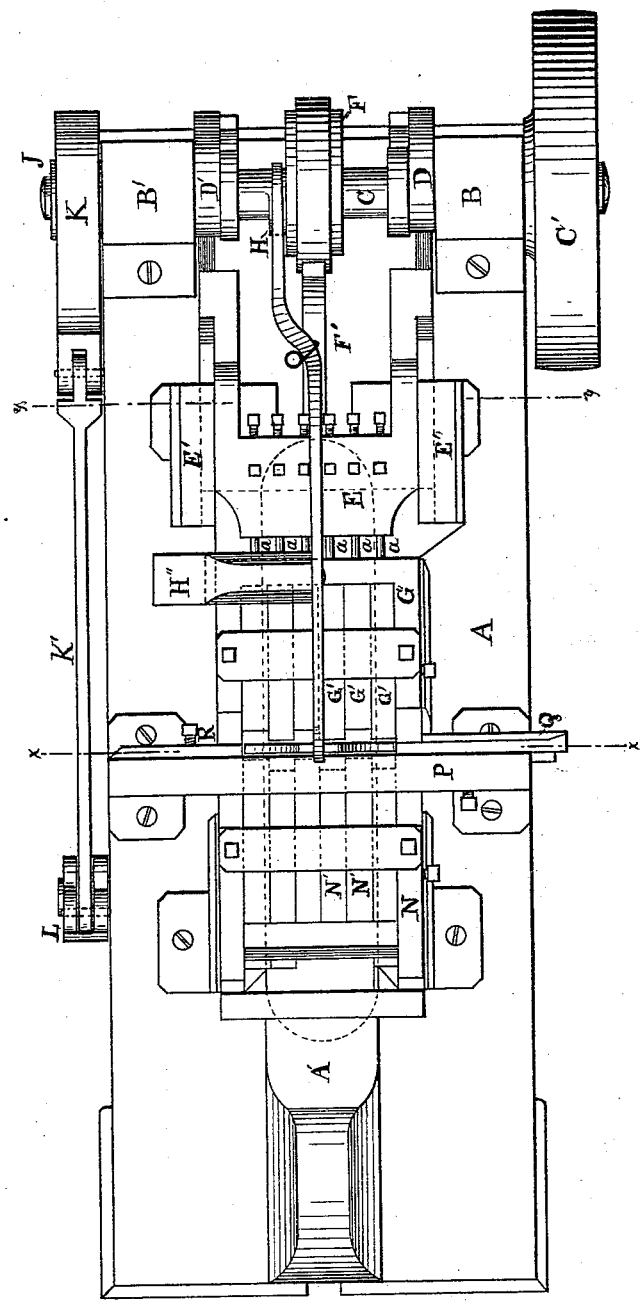
Figure 2:
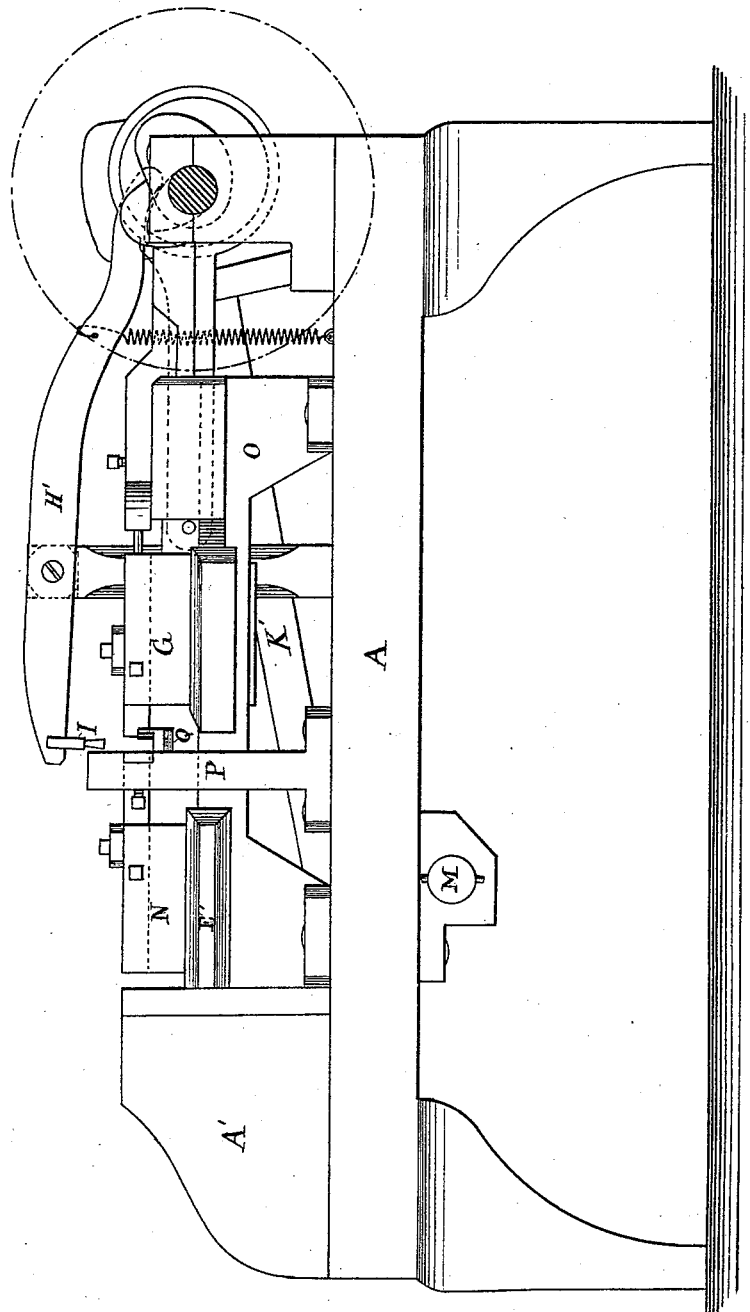
Figure 3:
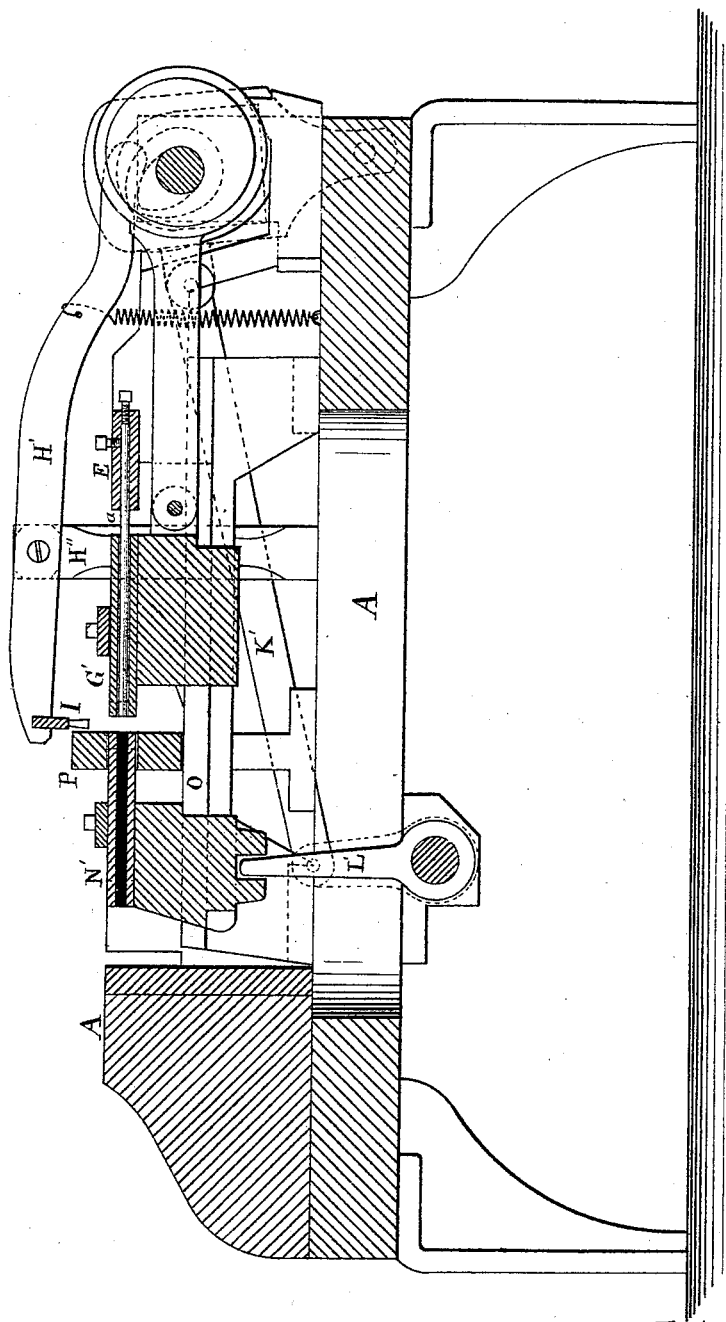
Figure 4:
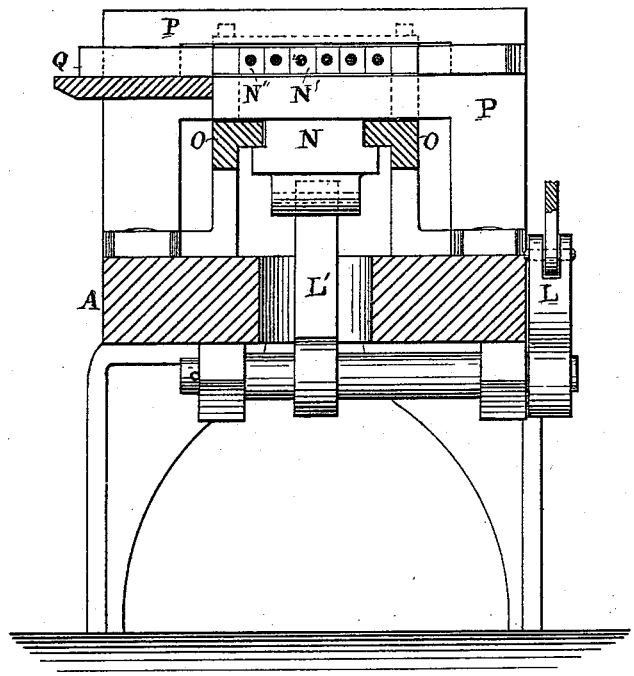
Figure 5:
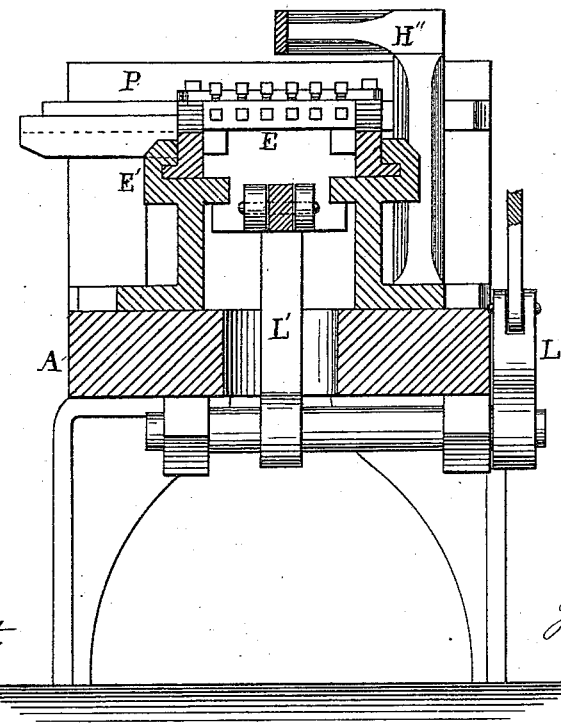

Figure 1 is a plan view of the machine, showing the relative arrangement of the dies, punches, and a portion of the mechanism for operating them. Fig. 2 is a side elevation, and shows the relation which the parts bear to each other vertically. Fig. 3 is a longitudinal section through the machine, showing the arrangement and construction of the dies and punches, and the method of operating them. Fig. 4 is a transverse section on the line $xx$ of Fig. 1. Fig. 5 is a section of the same figure on the line $yy$.

A represents the frame of the machine, which may be made of cast-iron, having the anvil or bearing-block A' cast thereon, the whole being supported upon suitable legs, which raise the working parts to a convenient height for the operator. At one end of the frame is placed two journal-boxes, B and B', in which revolves the driving-shaft C. This has upon one end a driving-pulley, C', a belt upon which, proceeding from any suitable motor, gives motion to the whole machine. Adjacent to the journal-boxes B and B' are secured, upon the shaft C, two double cams, D and D', by which motion is imparted, through suitable cam-yokes and connections, to the punch-carrier E, which is thus caused to have an intermittent reciprocating motion in the guideways E'. Midway between these cams D and D' is secured the eccentric F, which, by means of its strap and the connecting-rod F', gives a reciprocating movement to the die-holder G, moving in suitable guides, and carrying the series of cutting-dies G'. Attached to one side of the eccentric F is a cam, H, which gives a vibratory motion to the lever H', which is pivoted to the standard H'', and held in contact with the cam by a spring. It also carries upon the end opposite to the cam the clearer I, which removes the nuts, after they are formed, from the cutting-dies. Upon the outer end of the shaft C, adjoining the journal-box B', is fastened the cam J. This cam revolves in, and gives a vibratory movement to, the cam-yoke K, which is pivoted at its lower extremity to the frame of the machine, and has upon one side a projection, to which one end of the connecting-rod K is attached. The opposite end of this rod is pivoted to the arm L of the rock-shaft M, which is journaled in bearings secured to the under side of the frame A, and another arm, L', is secured upon this rock-shaft, and gives motion to the die-carrier N, which reciprocates between the guides O O. These guides are firmly bolted to the frame, and serve to maintain perfect parallelism in the movement of the die-carriers. A stationary die-block, P, having an elongated rectangular recess, through which the cutting-dies pass, is bolted to the frame between the two die-carriers, and forms the sides of the die in which the nuts are compressed and held during the operation of punching the holes for the screw-thread through them.

It will be seen that the cutting-dies N and G' are arranged in their respective carriers in two series, each series being composed of dies of different lengths, and so arranged that when the two carriers approach each other, the long dies upon one carrier shall enter the recesses formed by the short dies upon the other. These dies are also pierced from end to end, the orifice in the dies G' being for the passage of the series of punches $a\ a$, which are adjustably attached to the punch-carrier E, and form the holes for the screw-thread in the nut, and the others in the dies N' serving as passages, through which the pieces punched out pass in leaving the machine.

A guide, Q, through which the bar of metal from which the nuts are to be formed passes, is bolted to one side of the die-block P, and serves to keep the bar exactly in the proper position with relation to the cutting-dies to allow of their proper action. A stop, R, is bolted to the opposite end of the die-block P, and serves as a guide to prevent the insertion of too great a length of material.

In operating this machine, a bar of iron having been properly introduced, and the driving-shaft put in revolution, its first action is, through the medium of the cam J, to cause the die-carrier N to retreat until it rests firmly against the bearing-block A'. The eccentric F then forces forward the die-carrier G, the long cutting-dies in which, coming opposite the short dies in the carrier N, cut the interposed bar of metal into pieces corresponding in length to the spaces between the dies. A portion of these pieces are carried forward by the cutting-dies in the carrier G until they are brought into forcible contact with the short dies in the carrier N. The other portion remains upon the ends of the cutting-dies of the carrier N until struck and compressed by the short dies of the carrier G. At this moment the series of punches $a\ a$, which are so secured in the carrier E by set-screws as to be readily adjusted to the proper length, are pushed forward by the cams D D', and force a passage through each of the pieces or nuts, which are prevented from shifting by being wholly inclosed between the movable dies and the upper and lower parts of the stationary die P. The continued revolution of the shaft C then causes the punches to be retracted, they being drawn out of the nuts and into the dies G', which latter keep the nuts from following the punches. The die-carrier G is then quickly withdrawn, and the dies in the carrier N advance, bringing the nuts with them, when they have advanced so far as to be clear of the stationary die P. A smart stroke from the clearer I causes them to drop from the machine, and the parts are in position to repeat the operation.

This machine is found to be very effective, as its simplicity of construction, the number of parts being reduced to the lowest point possible, and still retain its efficiency as a whole, the facility with which any part when worn out or broken may be removed, and its place supplied by another, renders it of great value to manufacturers.

We are aware that machines have been constructed heretofore which formed a series of nuts simultaneously; but these, except that patented to Robt. Griffith, December 2, 1856, either required a separate machine to swage them after having been cut and punched, or they were formed upon the punches in the machine, after being cut, by means of hammers. We are also aware that nuts have been cut from the bar by a series of dies of different lengths. We do not, therefore, claim these features of the machine. And our machine, we maintain, is an improvement on Griffith's in that we avoid the interposition of a stripper between the bottom of the die and the cutter or plunger while the nut is being compressed after having been cut off; also, in the contrivance of a single stripping device that removes all of the nuts simultaneously, and by one movement of a cam and lever; and in that the top and bottom walls of the dies are permanent, and therefore simpler in construction than those of Griffith's, which are moved to and fro by cams.

We claim as our improvement—

1. The combination, with the series of cutters and punches, of the stationary die P, as specified.

2. The combination, with the series of cutters and punches and the stationary die P, of the stripping device I, operated as described.

In testimony that we claim the foregoing we have hereunto set our hands.

HENRY REYNOLDS.
RICHARD T. BARTON.

Witnesses:
D. R. WRIGHT,
ROBERT DICKERMAN.